US006600726B1

(12) United States Patent
Nevo et al.

(10) Patent No.: US 6,600,726 B1
(45) Date of Patent: Jul. 29, 2003

(54) MULTIPLE WIRELESS COMMUNICATION PROTOCOL METHODS AND APPARATUSES

(75) Inventors: Ron Nevo, Hillsboro, OR (US); Ephraim Zehavi, Haifa (IL); Brett A. Monello, Lake Oswego, OR (US); Ran Ginosar, Beaverton, OR (US)

(73) Assignee: Mobilian Corporation, Hillsboro, OR (US)

( * ) Notice: Subject to any disclaimer, the term of this patent is extended or adjusted under 35 U.S.C. 154(b) by 0 days.

(21) Appl. No.: 09/439,946

(22) Filed: Nov. 12, 1999

(65) Prior Publication Data (65)

Related U.S. Application Data

(63) Continuation-in-part of application No. 09/408,725, filed on Sep. 29, 1999.

(51) Int. Cl.[7] .............................................. H04B 7/005
(52) U.S. Cl. ........................ 370/278; 370/282; 370/286; 370/290; 370/343; 370/480; 370/497
(58) Field of Search ................................ 370/278, 279, 370/282, 286, 290, 334, 343, 480, 497, 521, 338, 395.5

(56) References Cited

U.S. PATENT DOCUMENTS

| 5,148,413 | A | * | 9/1992 | Endo et al. ................. 367/135 |
| 5,185,762 | A | * | 2/1993 | Schilling .................... 370/342 |
| 5,574,979 | A | * | 11/1996 | West ........................... 455/63 |
| 5,754,947 | A | | 5/1998 | Tanabe et al. |
| 5,852,405 | A | | 12/1998 | Yoneda et al. |
| 5,875,186 | A | | 2/1999 | Belanger et al. |
| 5,974,101 | A | * | 10/1999 | Nago .......................... 375/350 |
| 6,269,093 | B1 | * | 7/2001 | Alapuranen et al. ........ 370/343 |
| 6,272,120 | B1 | * | 8/2001 | Alexander ................... 370/338 |

FOREIGN PATENT DOCUMENTS

| EP | 0 812 069 A | 12/1997 |
| WO | WO 99 16266 | 4/1999 |
| WO | WO 99/29126 | 6/1999 |

OTHER PUBLICATIONS

Haartsen, J.C., "The Bluetooth Radio System," IEEE Personal Communications, IEEE Communications Society, US, vol. 7, No. 1, Feb. 2000, pp. 28–36.

* cited by examiner

Primary Examiner—Hassan Kizou
Assistant Examiner—Anh-Vu Ly
(74) Attorney, Agent, or Firm—Cooley Godward LLP

(57) ABSTRACT

A wireless device is provided with at least one wireless transceiver and at least one controller manager to transmit and receive signals wirelessly to and from network devices of a first and second wireless network, in a coordinated manner, in accordance with a first and a second protocol respectively. The wireless device is further provided with a network manager to coordinate the network devices of the first and second wireless networks to reduce interference between the network devices of the two wireless networks. In various embodiments, the reduction is effectuated through proactive avoidance of interference with dominant devices by dominated devices, whenever an interference is predicted to occur. In other embodiments, the reduction is effectuated through corresponding application of appropriate filtering to correspondingly cancel the respective interfering signals, whenever an interference is predicted to occur.

22 Claims, 13 Drawing Sheets

PROTOCOL 1

PROTOCOL 2

COMBINED SIGNAL

FILTER FOR PROTOCOL 1

FILTER FOR PROTOCOL 2

MULTIPLE WIRELESS COMMUNICATION PROTOCOL METHODS AND APPARATUSES

RELATED APPLICATION

This application is a continuation-in-part application of U.S. patent application Ser. No. 09/408,725, filed on Sep. 29, 1999, entitled "A Wireless Apparatus Having Multiple Coordinated Transceivers For Multiple Wireless Communication Protocols", and U.S. patent application Ser. No. 09/436,458, filed Nov. 8, 1999, entitled "A Wireless Apparatus Having A Transceiver Equipped To Support Multiple Wireless Communication Protocols".

BACKGROUND OF THE INVENTION

1. Field of the Invention

The present invention relates to the field of wireless communication. More specifically, the present invention relates to the problem of concurrent wireless communication with multiple communication partners of different wireless communication protocols.

2. Background Information

Advances in microprocessor and communication technology have led to the increase in popularity of wireless communication. Once confined to the privileged, wireless voice communication have become affordable and available to the masses. Today, various efforts are under way to apply wireless communication to replace attachment cables used for attaching peripheral devices, such as printers, scanners and the like, as well as networking cables used for connecting clients, servers and the like. A leading candidate to accomplish the former is commonly known to those skilled in the art as the Bluetooth technology or Bluetooth protocol. Examples of technology to accomplish the later include the different variants of the IEEE 802.11 Standard published by the Institute of Electrical and Electronic Engineers, 802.11 (Frequency Hoping, Direct Sequence), 802.11a, 802.1b, as well as Home RF, also known as Shared Wireless Access Protocol (SWAP) to those skilled in the art.

A need has emerged in a number of applications that it is desirable for a device to be able to operate "concurrently" in multiple wireless protocols. One such applications is having a notebook computer being able to communicate with peripheral devices such as a phone, a printer, a scanner and the like, in accordance with the Bluetooth protocol; and with other computing devices, such as other peer computers or servers, communication devices, such as modems or adapters, and networking devices, such as gateways, routers, switches and the like, in accordance with one of the 802.11 protocols or Home RF.

However, the need cannot be met by simply providing the device with multiple transmitters, one for each protocol. The reason is because if multiple ones of these transmitters were to transmit at the same time. The transmitters are going to interfere with each other, resulting in corruption and/or loss of data, as well as degradation in performance.

As will be described in more detail below, the present invention substantially address this need in a very efficient and low cost manner. This and other advantages of the present invention will be readily apparent from the description to follow.

SUMMARY OF THE INVENTION

A wireless device is provided with at least one wireless transceiver and at least one controller manager to transmit and receive signals wirelessly to and from network devices of a first and a second wireless network, in a coordinated manner, in accordance with a first and a second protocol respectively. The wireless device is further provided with a network manager to coordinate the network devices of the first and second wireless networks to reduce interference between the network devices of the two wireless networks.

In one embodiment, the coordination includes selection of network devices of either the first or the second network as dominant devices that operationally dominate network devices of the other network. The coordination further includes notifying the dominated devices, from time to time, to temporarily suspend operation, to proactively avoid frequency interference with the dominant devices.

In an alternate embodiment, the coordination includes notifying the network devices of filtering to be employed by the network devices to resolve interference, and from time to time, to apply the filtering to resolve interference.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using software terminology commonly employed by those skilled in the art to convey the substance of their work to others skilled in the art. As well understood by those skilled in the art, these software quantities take the form of electrical, magnetic, or optical signals capable of being stored, transferred, combined, and otherwise manipulated through mechanical and electrical components of a digital system; and the term digital system includes general purpose as well as special purpose processors, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the steps are presented. Furthermore, the phrase "in one embodiment" will be used repeatedly, however the phrase does not necessarily refer to the same embodiment, although it may.

Figure 1:
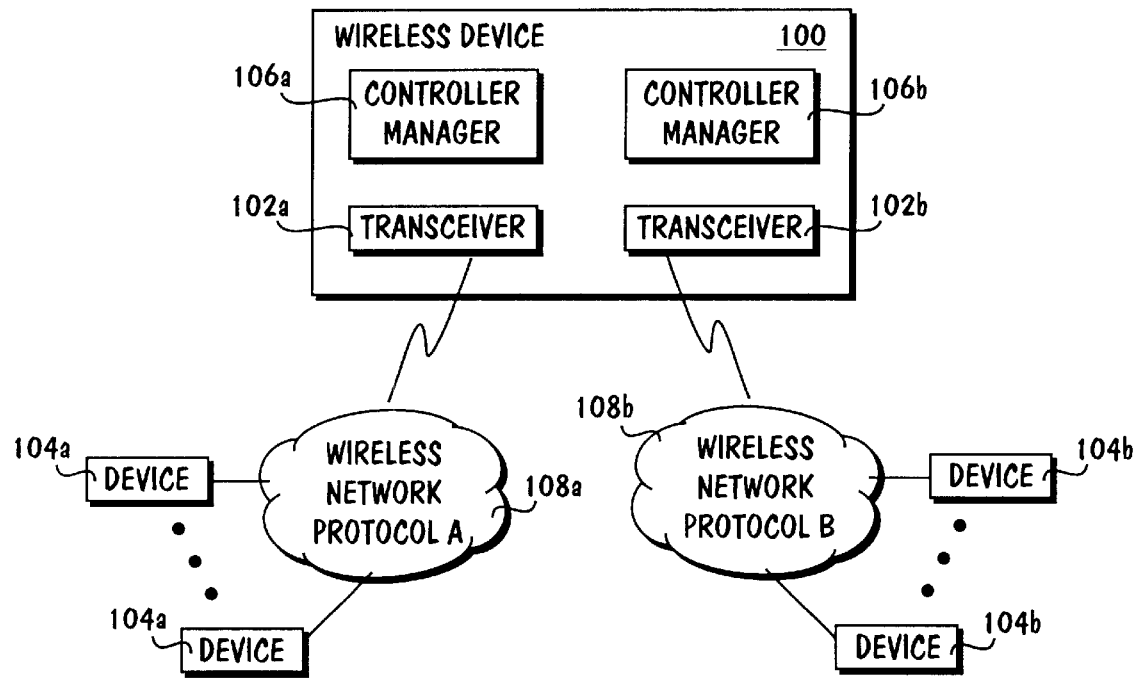
FIG. 1 illustrates an overview of the wireless device of the present invention, in accordance with one embodiment.

Referring now to FIG. 1, wherein an overview of the present invention, in accordance with one embodiment, is shown. As illustrated, wireless device 100 is provided with wireless transceivers 102a and 102b to transmit and receive signals wirelessly in accordance with a first and a second wireless communication protocol, to enable device 100 to be communicatively coupled to devices 104a and devices 104b of wireless networks 108a and 108b respectively. Wireless device 100 further includes controller managers 106a and 106b to control the operation of wireless transceivers 102a and 102b respectively. As will be described in more detail below, controller managers 106a and 106b control transmits and receives by wireless transceivers 102a and 102b, in a coordinated manner, in accordance with the present invention, to allow wireless device 100 to operate with devices 104a and devices 104b of wireless network 108a and 108b in accordance with the respective wireless communication protocols at the same time.

Figure 2:
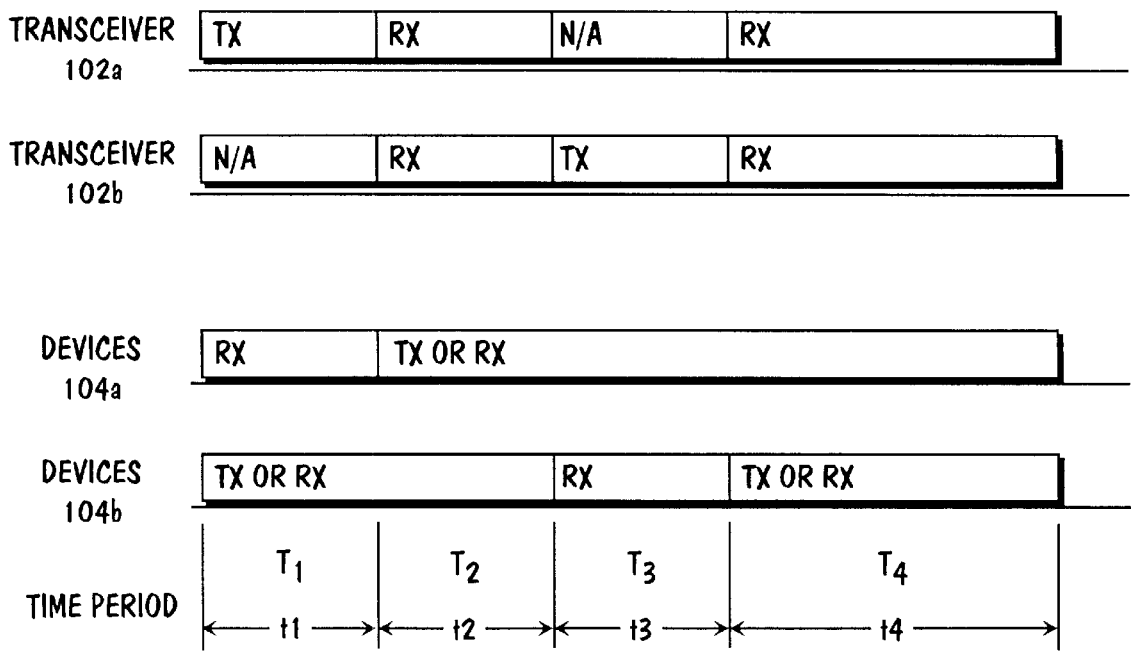
FIG. 2 illustrates a period of operation of the wireless devices of FIG. 1, in accordance with one embodiment.

In one embodiment, controller managers 106a and 106b control transmits and receives by wireless transceivers 102a and 102b (hereinafter, simply transceivers), in a coordinated manner. More specifically, in this embodiment, controller managers 106a and 106b control transceivers 102a and 102b to alternate between transmits by one of the two transceivers and receives by both of the two transceivers. FIG. 2 illustrates a period of operation in accordance with this embodiment. As shown, in time period T1, for duration t1, control manager 106a controls transceiver 102a to perform transmit of signals to devices 104a of wireless network 108a (hereinafter, simply network) in accordance with the first wireless communication protocol (hereinafter, simply protocol), while control manager 106b controls transceiver 102b to neither perform transmit nor receive of signals to and from devices 104b of network 108b. In time period T3, for duration t3, the reverse is performed. Control manager 106b controls transceiver 102b to perform transmit of signals to devices 104b of network 108b in accordance with the second protocol, while control manager 106a controls transceiver 102a to neither perform transmit nor receive of signals to and from devices 104a of network 108a. In time periods T2 and T4, for duration t2 and t4 respectively, control managers 106a and 106b control both transceivers 102a and 102b to perform receive of signals from devices 104a and 104b of network 108a and 108b in accordance with the respective protocols respectively.

Since all wireless protocols operate on either a carrier sense or contention free protocol, devices 104a are able to receive in time period T1, and transmit when there are packets to transmit, but otherwise receive, in time periods T2–T4. Likewise, devices 104b are able to receive in time period T3, and transmit when there are packets to transmit, but otherwise receive, in time periods T1–T2 and T4.

Accordingly, wireless device 100 is able to operate with devices 104a and 104b of networks 108a and 108b in two wireless protocols at the same time.

Note that time periods T1–T4 may or may not be equal in duration. That is, numerically t1–t4 may or may not be equal. As will be described in more detail below, in different variants of this embodiment, duration t1–t4 of time periods T1–T4 are dynamically and adaptively set. In particular, in some variants, duration t1–t4 of time periods T1–T4 are adaptively set based at least in part of transmit and receive workloads of networks 108a and 108b.

Referring back to FIG. 1, except for the teachings of the present invention incorporated in wireless device 100 to effectuate the above described coordinated manner of operation of transceivers 102a and 102b, transceivers 102a and 102b as well as controller managers 106a and 106b are otherwise intended to represent a broad range of these elements known in the art. Accordingly, except for the teachings of the present invention, which will be further described below, transceivers 102a and 102b and controller managers 106a and 106b will not be otherwise further described.

Wireless device 100 is intended to represent a wide range of devices that can benefit from having the ability to wirelessly operate with other wireless devices in two or more wireless communication protocols at the same time. Examples of device 100 include but not limited to computers of various form factors, such as desktop, notebook, palm size and so forth, controller devices (i.e. master devices) to manage and control the operation of networks 108a and 108b, and gateway devices to facilitate communication between devices 104a and devices 104b.

Likewise, devices 104a and 104b are intended to represent a broad range of devices that can benefit from being able to communicate wirelessly. Examples of devices 104a include but not limited to phones, video cameras, speakers, modems, printers and scanners equipped to wireless communicate in accordance with the Bluetooth protocol. Examples of devices 104b include clients and servers, as well as gateways, modems, hubs, routers, and switches equipped to wireless communicate in accordance with a selected variant of the IEEE 802.11 protocols or Home RF.

For ease of understanding, only two groups of devices 104a and 104b, communicating in accordance with the first and second wireless communication protocols are shown in FIG. 1. However, from the description to follow, it will be readily apparent to those skilled in the art, the present invention may be practiced with more than two transceivers (as long as the transceivers are likewise coordinated).

Figure 3:
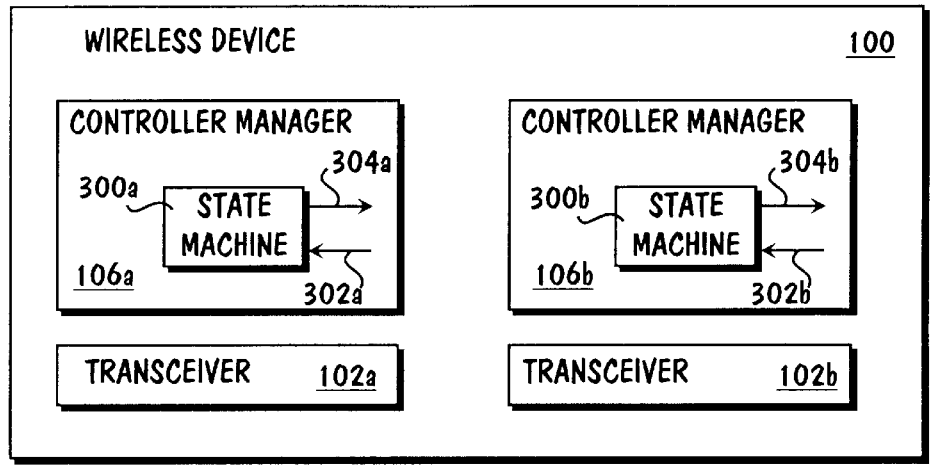
FIG. 3 illustrates the wireless device of FIG. 1 in further detail, in accordance with one implementation.
Figure 4:
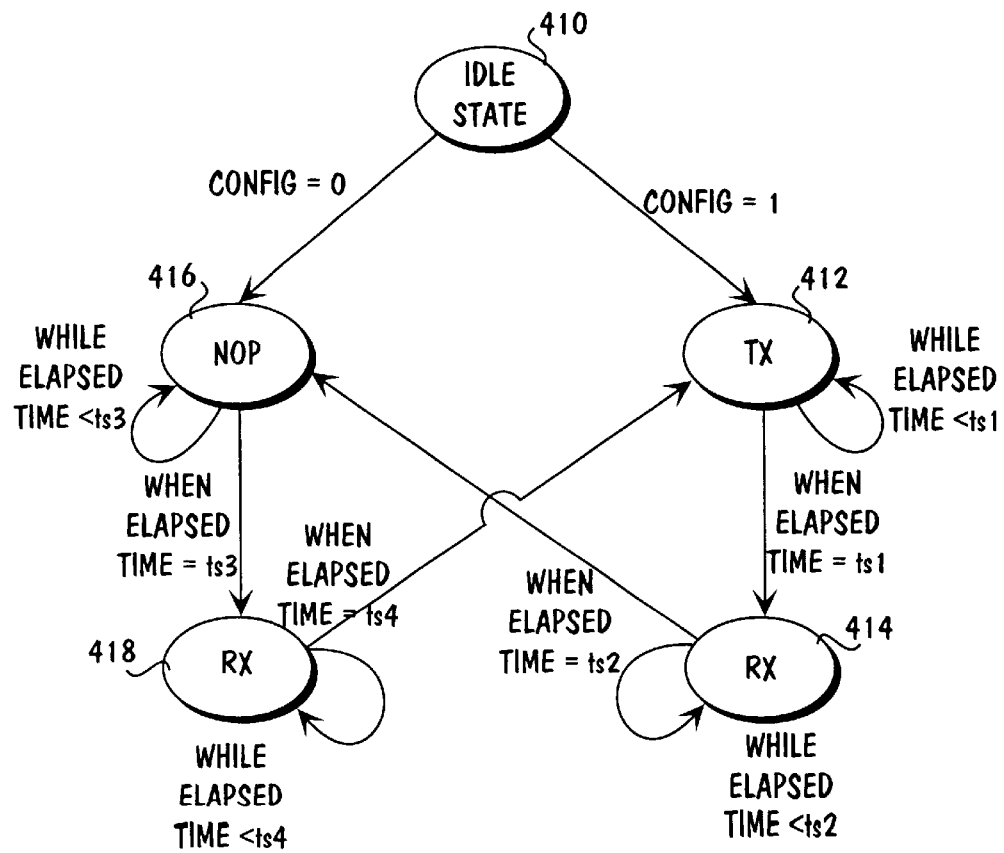
FIG. 4 illustrates the operational states and flow of the state machine of FIG. 3 in further detail, in accordance with one implementation.

Referring now to FIGS. 3 and 4, wherein a block diagram and a state diagram illustrating wireless device 100 of FIG. 1 in further detail, in accordance with one embodiment, are shown. As illustrated, each controller manager 106a/106b of wireless device 100 is endowed with a state machine 300a/

300b to complementarily assist the controller manager 106a/106b to control its transceiver 102a/102b in the above described coordinated manner. More specifically, each state machine 300a/300b, in addition to idle state 410, has four operating states 412–418 (TX, RX1, NOP, and RX2) to output a signal 304a/304b denoting a selected one of a transmit (TX) operation, a receive (RX) operation and no-op (NOP) for its controller manager 106a/106b.

Upon power-on or reset, each state machine 300a/300b either transitions from idle state 410 to TX state 412 or NOP state 416, depending on the state of configuration (config) signal 302a/302b. One state machine, e.g. 300a, is configured to transition from idle state 410 to TX state 412, while the other state machine, e.g. 300b, is configured to transition from idle state 410 to TX state 412. Config signal 302a/302b may be set e.g. via a jumper or other equivalent means, as well as through software.

While in TX state 412, state machine 300a/300b remains in the state for duration ts1, outputting signal 304a/304b denoting TX operation for its controller manager 1026a/106b. In one embodiment, where t1 and t3 may take on different values, one state machine, e.g. 300a, is configured with ts1 set to t1, while the other state machine, e.g. 300b, is configured with ts1 set to t3. Ts1 may be selectively set in any one of a number of techniques known in the art, e.g. through separate registers or multiplexing circuitry. Upon expiration of ts1, state machine 300a/300b transitions from TX state 412 to RX1 state 414.

While in RX1 state 414, state machine 300a/300b remains in the state for duration ts2, outputting signal 304a/304b denoting RX operation for its controller manager 106a/106b. In one embodiment, where t2 and t4 may take on different values, one state machine, e.g. 300a, is configured with ts2 set to t2, while the other state machine, e.g. 300b, is configured with ts2 set to t4. Ts2 may likewise be selectively set in any one of a number of techniques known in the art. Upon expiration of ts2, state machine 300a/300b transitions from RX1 state 414 to NOP state 416.

While in NOP state 416, state machine 300a/300b remains in the state for duration ts3, outputting signal 304a/304b denoting NOP for its controller manager 106a/106b. In one embodiment, where t1 and t3 may take on different values, one state machine, e.g. 300a, is configured with ts3 set to t3, while the other state machine, e.g. 300b, is configured with ts3 set to t1. Ts3 may likewise be selectively set in any one of a number of techniques known in the art. Upon expiration of ts3, state machine 300a/300b transitions from NOP state 416 to RX2 state 418.

While in RX2 state 418, state machine 300a/300b remains in the state for duration ts4, outputting signal 304a/304b denoting RX operation for its controller manager 106a/106b. In one embodiment, where t2 and t4 may take on different values, one state machine, e.g. 300a, is configured with ts4 set to t4, while the other state machine, e.g. 300b, is configured with ts4 set to t2. Ts4 may likewise be selectively set in any one of a number of techniques known in the art. Upon expiration of ts4, state machine 300a/300b transitions from RX2 state 418 to TX state 412.

From TX state 412, state machine 300a/300b continues operation as described earlier.

Figure 5:
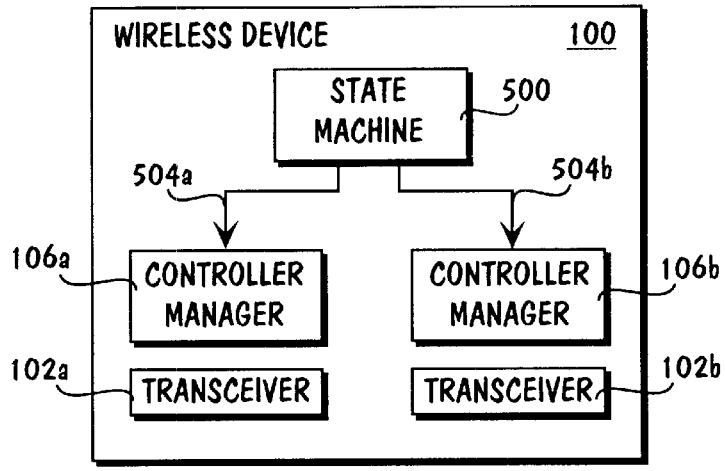
FIG. 5 illustrates the wireless device of FIG. 1 in further detail, in accordance with another implementation.
Figure 6:
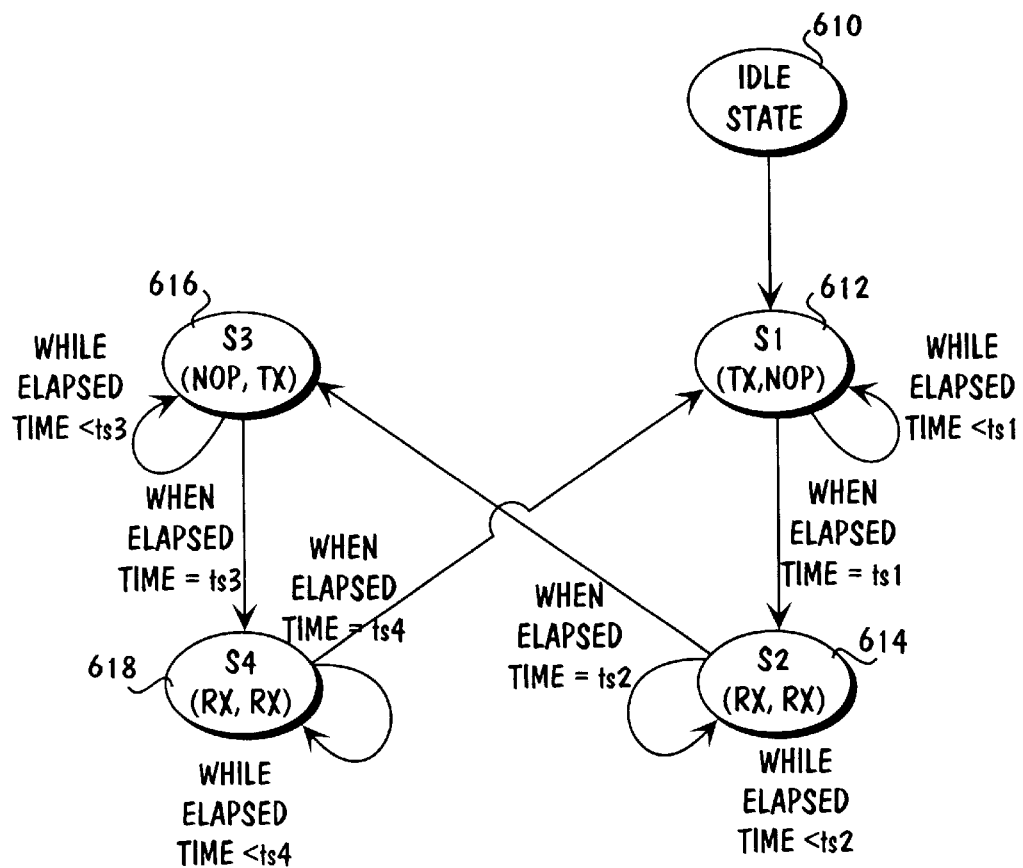
FIG. 6 illustrates the operational states and flow of the state machine of FIG. 5 in further detail, in accordance with one implementation.

Referring now to FIGS. 5 and 6, wherein a block diagram and a state diagram illustrating wireless device 100 of FIG. 1 in further detail, in accordance with another embodiment, are shown. As illustrated, for this embodiment, instead of having each controller manager 106a/106b of wireless device 100 be endowed with a state machine to complementarily assist the controller manager 106a/106b to control its transceiver 102a/102b in the above described coordinated manner, wireless device 100 is endowed with a single state machine 500 to assist both controller managers 106a and 106b. Similarly, state machine 500, in addition to idle state 610, has four operating states 612–618 (S1–S4) to output a pair of signals 504a–504b denoting a selected combination of operations, TX with NOP, both RX, and NOP with TX for controller managers 106a and 106b.

Upon power-on or reset, state machine 500 transitions from idle state 610 to S1 state 612. While in S1 state 612, state machine 500 remains in the state for duration ts1, outputting signal 504a–504b denoting TX and NOP for controller managers 106a and 106b. Ts1 is set to t1. Upon expiration of ts1, state machine 500 transitions from S1 state 612 to S2 state 614. While in S2 state 614, state machine 500 remains in the state for duration ts2, outputting signal 504a–504b denoting RX for both controller managers 106a and 106b. Ts2 is set to t2. Upon expiration of ts2, state machine 500 transitions from S2 state 614 to S3 state 616.

While in S3 state 616, state machine 500 remains in the state for duration ts3, outputting signal 504a–504b denoting NOP and TX for controller managers 106a and 106b. Ts3 is set to t3. Upon expiration of ts3, state machine 500 transitions from S3 state 616 to S4 state 618. While in S4 state 618, state machine 500 remains in the state for duration ts4, outputting signal 504a–504b denoting RX for both controller managers 106a and 106b. Ts4 is set to t4. Upon expiration of ts4, state machine 500 transitions from S4 state 618 to S1 state 612.

From S1 state 612, state machine 500 continues operation as described earlier.

Figure 7:
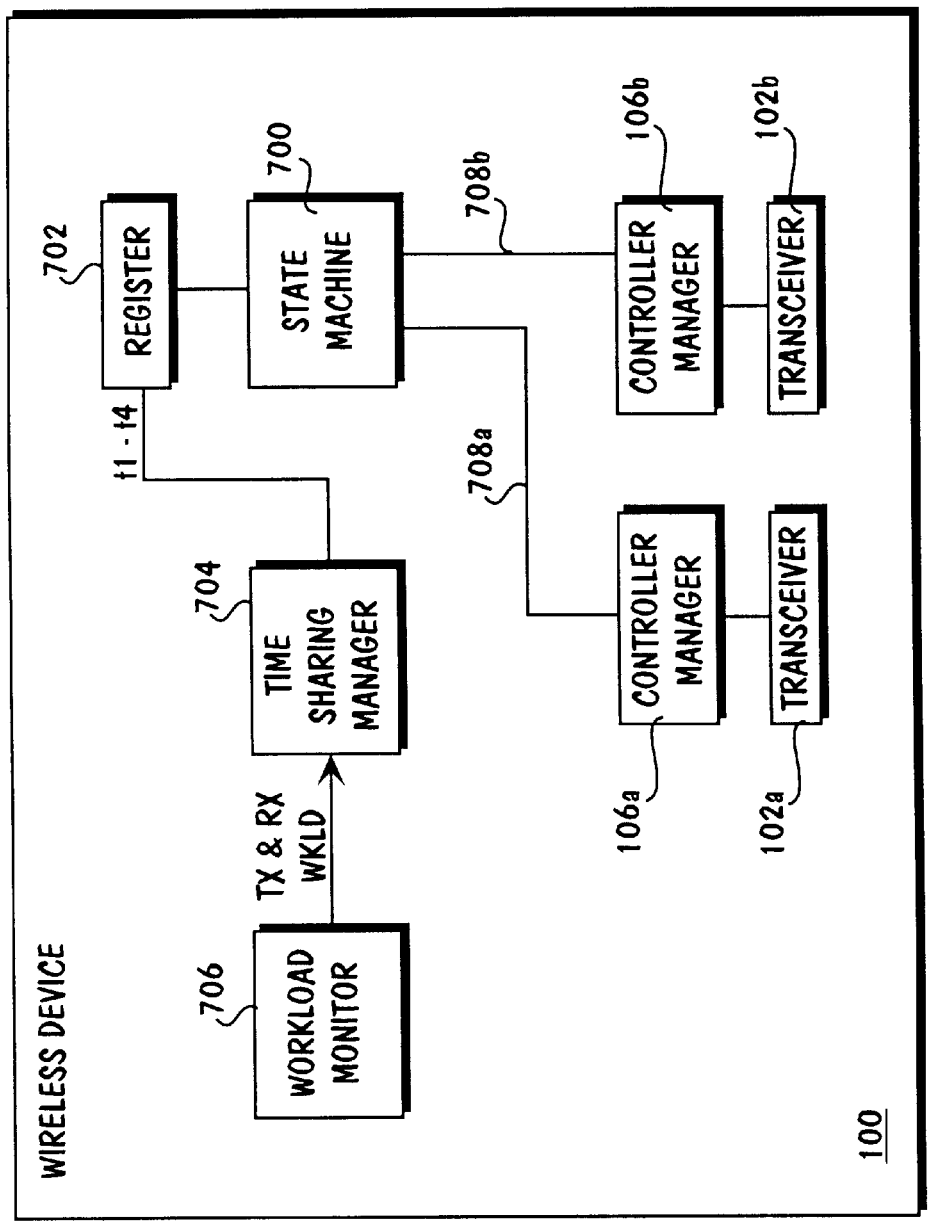
FIG. 7 illustrates the wireless device of FIG. 1 in further detail, in accordance with yet another implementation.

Referring now to FIG. 7, wherein a block diagram illustrating wireless device 100 of FIG. 1 in further detail, in accordance with yet another embodiment, is shown. As illustrated, for this embodiment, in addition to having wireless device 100 be endowed with a single state machine 700 to assist both controller managers 106a and 106b as described earlier (with signals 708a–708a denoting TX-NOP, RX-RX or NOP-TX), wireless device 100 is further endowed with register 702, time sharing manager 704, and workload monitor 706 operatively coupled to each other and state machine 700 as shown. Register 702 stores t1–t4 for state machine 700. Time sharing manager 704 dynamically adjusts t1–t4 to enable state machine 700 be able to adaptively assist controller managers 106a and 106b in controlling transceivers 102a and 102b. For the illustrated embodiment, time sharing manager 704 dynamically adjusts t1–t4 based at least in part on transmit and receive workloads of networks 108a and 108b. Transmit and receive workloads are monitored by workload monitor 706 and provided to time sharing manager 704.

Register 702 may be constituted with any storage circuitry known in the art. Time sharing manager 704 and workload monitor 706 may be implemented with any combinatorial logic or in software.

Figure 8A:
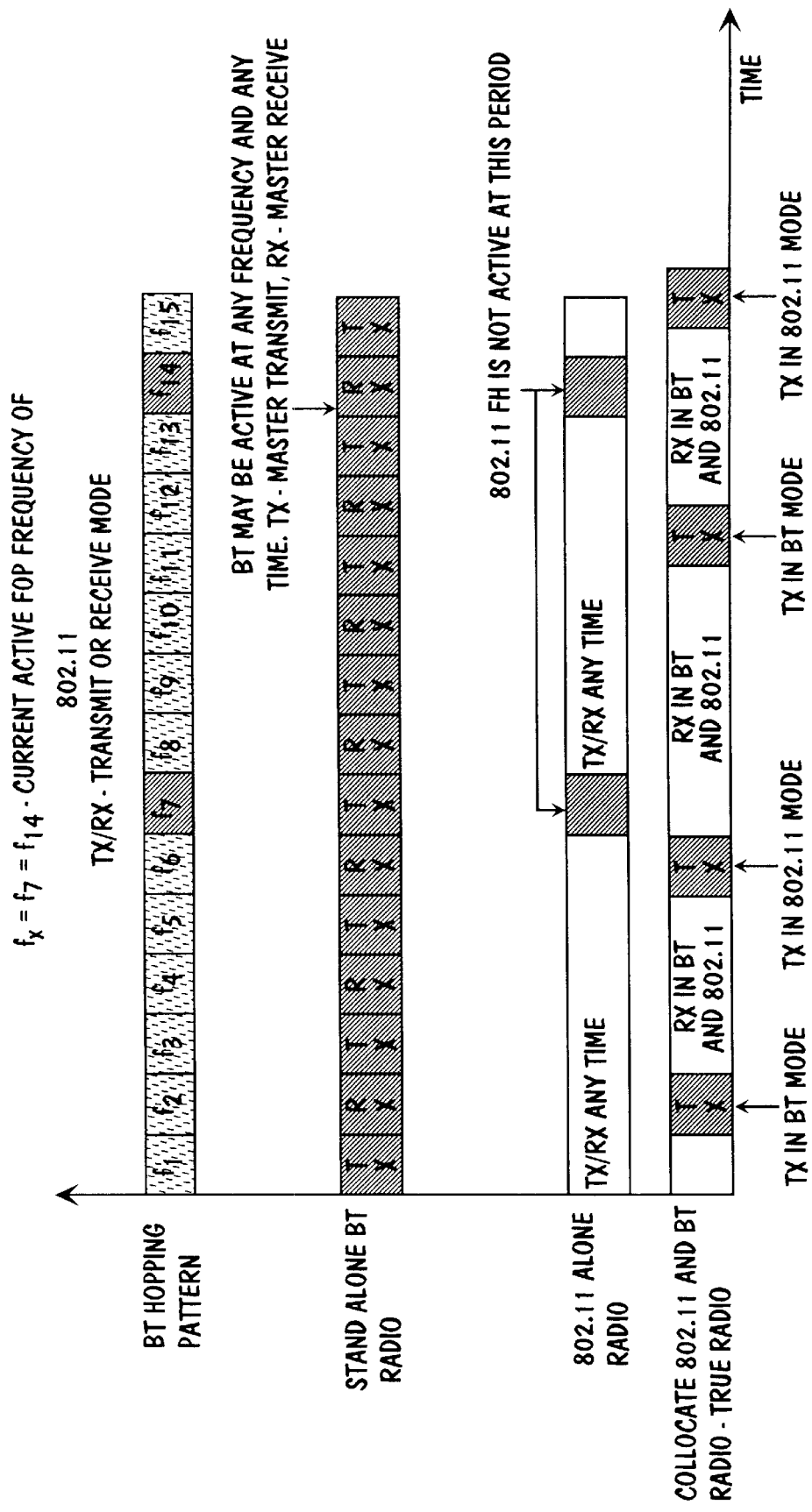
FIGS. 8a–8b illustrate a period of operation of the wireless devices of FIG. 1, in accordance with each of two alternate embodiments.
Figure 8B:
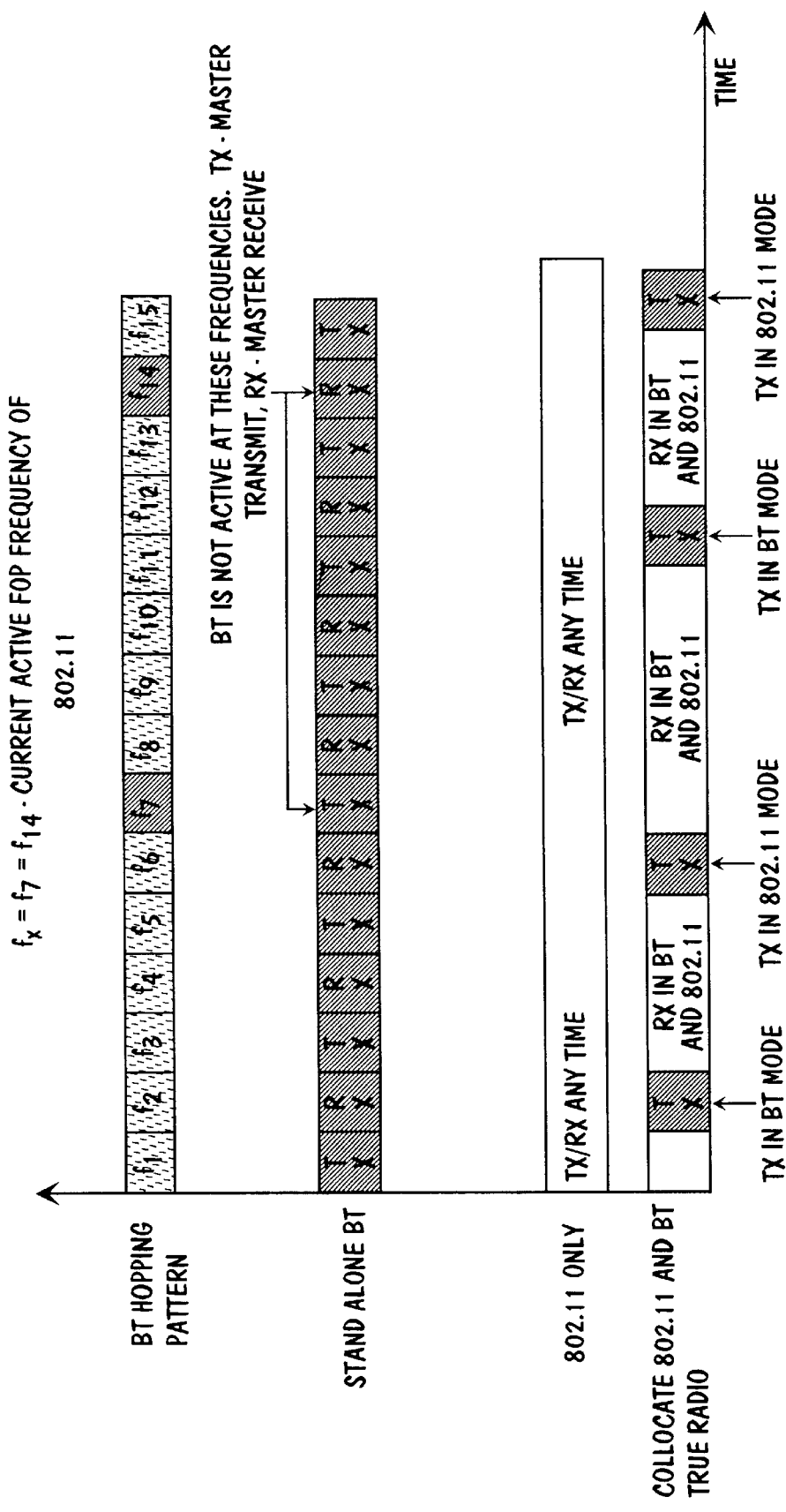

Referring now to FIGS. 8a–8b, wherein a period of operation for the wireless devices of FIG. 1 in accordance with each of two alternate embodiments are shown. In each of these two alternate embodiments, first protocol of wireless devices 104a of network 108a is assumed to be a frequency hopping protocol as shown, i.e. wireless devices 104a hop from frequency to frequency in accordance with a pseudo random pattern to transmit signals. For ease of understanding, second protocol of wireless devices 104b of network 108b is assumed to be a constant frequency protocol (although in alternate embodiments, it may also be a frequency hopping protocol). In any event, to illustrate the present invention, at least one of the frequencies of the first protocol is the same frequency of the second protocol. Thus, if some of devices 104a and 104b are located sufficiently close to each other, and when one of devices 104a selects the same frequency for transmission, interference (or collision) between these devices will occur, resulting in one or more transmission failures. For the illustrated example, frequency interference (or collision) is shown to occur at the $7^{th}$ and $14^{th}$ hop ($f_7$ and $f_{14}$). That is, in accordance with the pseudo random pattern, in each of these two hops, devices 104a transmit in the same frequency employed by devices 104b. An example of a frequency hopping protocol is the Bluetooth protocol, and an example of a protocol having an interfering frequency with Bluetooth is the 802.11 protocol. [Note that the example interference at the $7^{th}$ and $14^{th}$ hop is not intended to suggest that the interference occurs at every $7^{th}$ hop. The interference pattern is dictated by the intersection of the pseudo random pattern followed by the frequency hopping devices 104a and the frequency employed by devices 104b.]

To further improve the operating efficiencies of both network, instead of just letting the interfering devices 104a and 104b resolve each of the frequency interference, after it occurred, through conventional collision detection, back off and retry approaches, wireless device 100 coordinates the operation of devices 104a and 104b to proactively reduce actual occurrence of interference. More specifically, for the illustrated embodiments, either devices 104a or devices 104b are selected to be the "dominant" devices. The non-selected devices are considered to be the dominated devices. The dominated devices are notified, from time to time, to suspend operation to pro-actively avoid interference with the dominant devices, allowing the dominant devices to continue to operate without interference. As result, the time consuming collision detection, back off and retries are substantially reduced, and experience has shown that the overall operating efficiencies of both networks improve, the dominated network as well as the dominant network.

FIG. 8a illustrates a period of operation when devices 104a, the frequency hopping devices, are selected to be the dominant devices, while FIG. 8b illustrates a period of operation when devices 104b are selected to be the dominant devices. That is, under FIG. 8a, devices 104b, upon informed, will temporarily suspend operation to proactively avoid interference, whereas under FIG. 8b, devices 104a, upon informed, will temporarily suspend operation to pro-actively avoid interference.

Under either one of these embodiments, wireless device 100 basically operates as earlier described. Except wireless device 100 assumes the additional responsibilities of determining the pseudo random frequency hopping pattern of devices 104a (in one embodiment, including the interfering frequency), selecting either devices 104a or 104b to be the dominated devices, predicting the occurrence of interference, and preemptively notifying the dominated devices to suspend operation to avoid interference (in one embodiment, conditionally suspending operation).

Figure 9A:
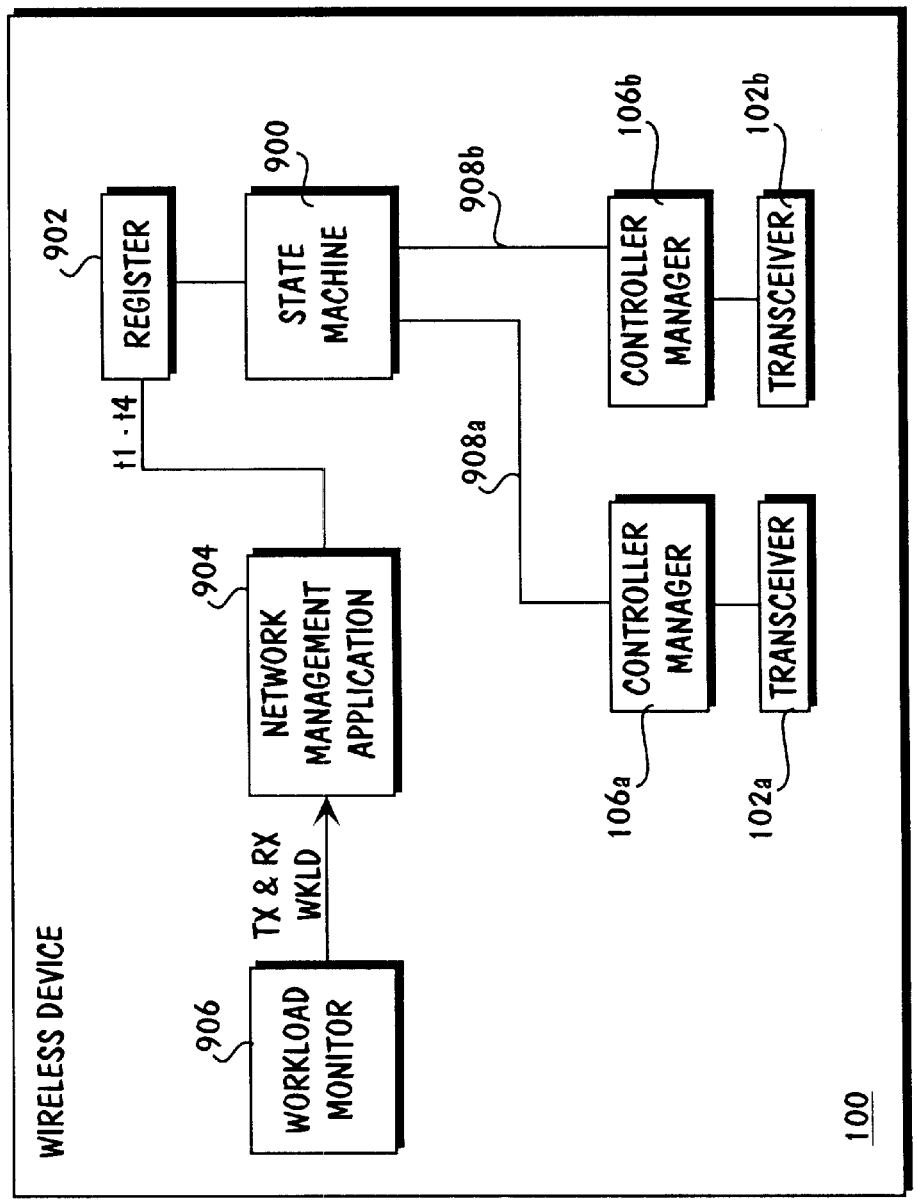
FIGS. 9a–9b illustrate the architecture and operational flow of the wireless device 100 of FIG. 1 for practicing a selected one of the methods of operation of FIGS. 8a–8b, in accordance with one embodiment.
Figure 9B:
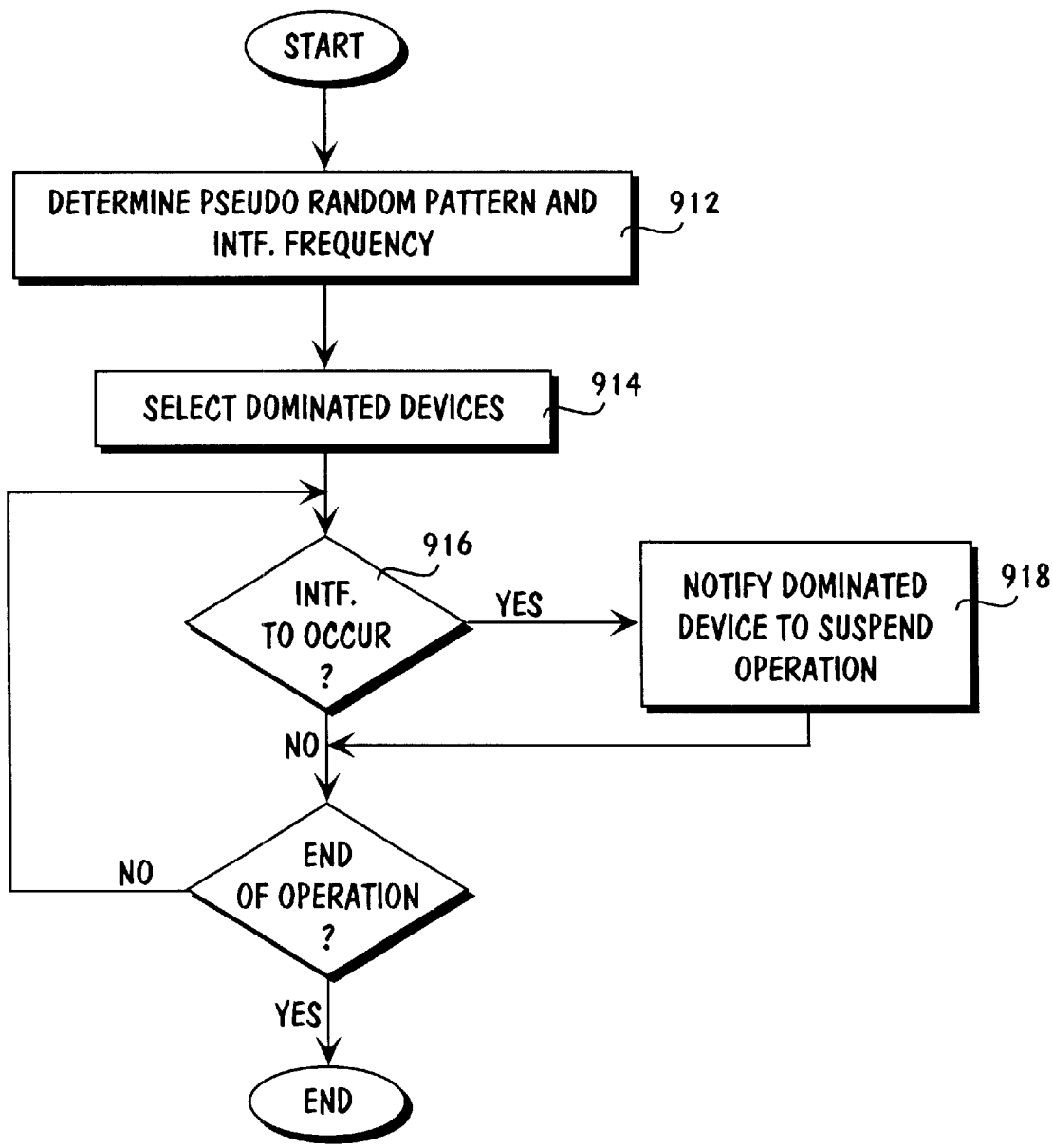

Referring now to FIGS. 9a–9b, wherein the architecture and operational flow of wireless device 100 having these added responsibilities are shown. As illustrated in FIG. 9a, wireless device 100 is basically the embodiment earlier described referencing FIG. 7, except wireless device 100 is further provided with network management application (or network manager) 904 to proactively managing network devices 104a and 104b to reduce actual occurrence of interference. Network manager 904 also subsumes the earlier described responsibilities of time sharing manager 704, i.e. monitoring the workloads of the two protocols, and adaptively setting the values of t1–t4 for time period T1–T4.

Operationally, as illustrated in FIG. 9b, upon initialization, network manager 904 monitors the operation of devices 104a and 104b for an observation period, and determines the pseudo random frequency hopping pattern followed by devices 104a (and in one embodiment, the interfering frequency with devices 104b), 912. This may be accomplished using any one of a number of techniques known in the art. Next, network manager 904 selects either devices 104a or devices 104b to be the dominant devices, 914. In one embodiment, network manager 904 makes the selection in accordance with configuration information programmed in configuration register 902. In alternate embodiments, other configuration registers, or other techniques known in the art, such as jumpers, may also be employed to assist network manager 904 in making the selection.

Then, on an on going basis, network manager 904, predicts when interference will occur, using the determined pseudo random pattern and interference frequency, 916. Whenever, an interference is to occur, network manager 904 preemptively notifies the dominated devices to suspend operation accordingly, thereby allowing the dominant devices to operate without interference, 918. [In one embodiment, if the dominated devices are devices 104a, the notification includes the interfering frequency, and the suspension is conditional, only if the predicted frequency is indeed the interfering frequency.] The process continues, as long as there are wireless devices of both types 104a and 104b operating.

In one embodiment, network manager 904 repeats the calibration periodically. In yet another embodiment, network manager 904 monitors actual interference between devices 104a and 104b, and tracks the mean time between interference. Network manager 904 repeats the calibration, whenever the tracked mean time between interference drops below certain given performance level.

Note that in embodiments where the number of devices 104a and 104b present in networks 108a and 108b are relatively small, including in particular, the simplest case where there is only one device 104a and one device 104b in networks 108a and 108 respectively, network manager 904 may make the selection of the dominated devices in a dynamic and individualized manner, when an interference is predicted to occur. That is, different device or devices 104a and 104b are dynamically and individually selected for different predictions of interference. Such dynamic, individualized manner of selection may also be made in view of the workloads of the two protocols.

As those skilled in the art would appreciate, the above described improved manner of operation (including the embodiment, where suspension is to be conditionally made by devices 104a) may be practiced with minimal or no change to devices 104,a and 104a, as virtually all network devices are capable of temporarily suspending operation responsive to a request. As to the embodiment where suspension is to be conditionally made by devices 104a, the conditional performance may be effectuated through addition of simple frequency testing combinatorial logic.

Figure 10:
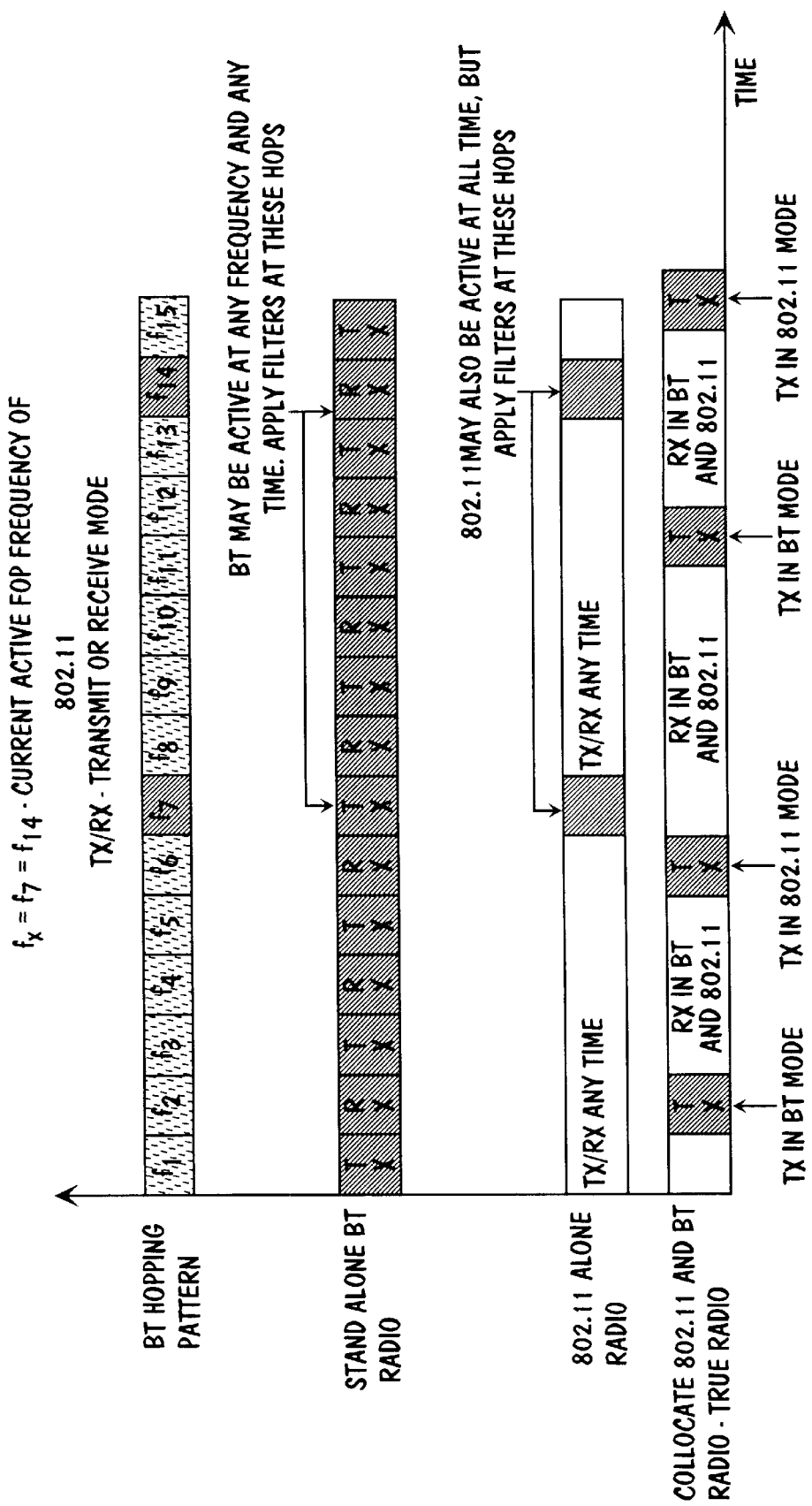
FIG. 10 illustrates a period of operation of the wireless devices of FIG. 1, in accordance with another embodiment.

Referring now to FIG. 10, wherein a period of operation for the wireless devices of FIG. 1 in accordance with another embodiment is shown. Again, first protocol of wireless devices 104a of network 108a is assumed to be a frequency hopping protocol, and second protocol of wireless devices 104b of network 108b is assumed to be a constant frequency protocol (although it may also be a frequency hopping protocol). Nevertheless, for illustrative purpose, it is suffice that at least one of the frequencies of the first protocol of wireless devices 104a conflicts with the frequency of the second protocol of wireless devices 104b as shown, and earlier described. Thus, in like manner, if some of devices 104a and 104b are located sufficiently close to each other, and devices 104a select to transmit in the same frequency, interference (or collision) will occur, resulting in one or more transmission failures. To further improve the operating efficiencies of both network, instead of just letting the interfering devices 104a and 104b resolve each of the frequency interference, after it occurred, through conventional collision detection, back off and retry approaches, wireless device 100 coordinates the operation of devices 104a and 104b to proactively reduce actual occurrence of interference. More specifically, under this embodiment, devices 104a and 104b are correspondingly notified of the filtering to be employed to correspondingly cancel the respective interfering signals, and when to apply the filtering. As will be described in more detail below, in one embodiment, the filtering to be employed is a notch filter inversely formed in accordance with the other devices' signal. As a result, the time consuming collision detection, back off and retries are also substantially reduced, and experience has shown that the overall operating efficiencies of both networks also improve.

As illustrated in FIG. 10, at each predicted occurrence of interference, both devices 104a and 104b apply the corresponding required filtering to correspondingly cancel the respective interfering signals. As before, the basic operations of wireless device 100 remain substantially unchanged, except, wireless device 100 assumes the additional responsibilities of determining the pseudo random frequency hopping pattern of devices 104a, the interfering frequency, the corresponding filtering to be employed to cancel the respective interfering signals, and preemptively notifying devices 104a and 104b of the determined filtering as well as when to apply them.

Figure 11A:
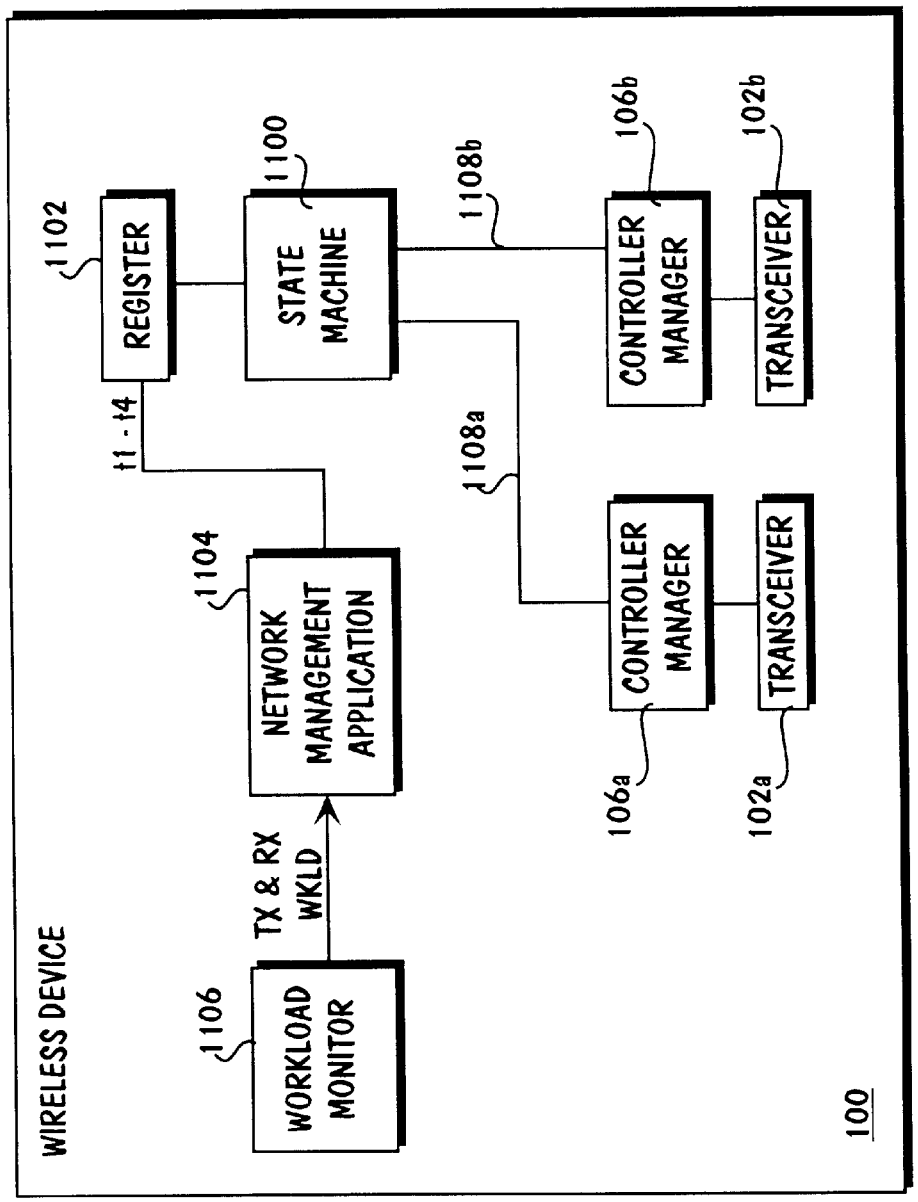
FIGS. 11a–11b illustrate the architecture and operational flow of the wireless device 100 of FIG. 1 for practicing the method of operation of FIG. 11, in accordance with one embodiment.
Figure 11B:
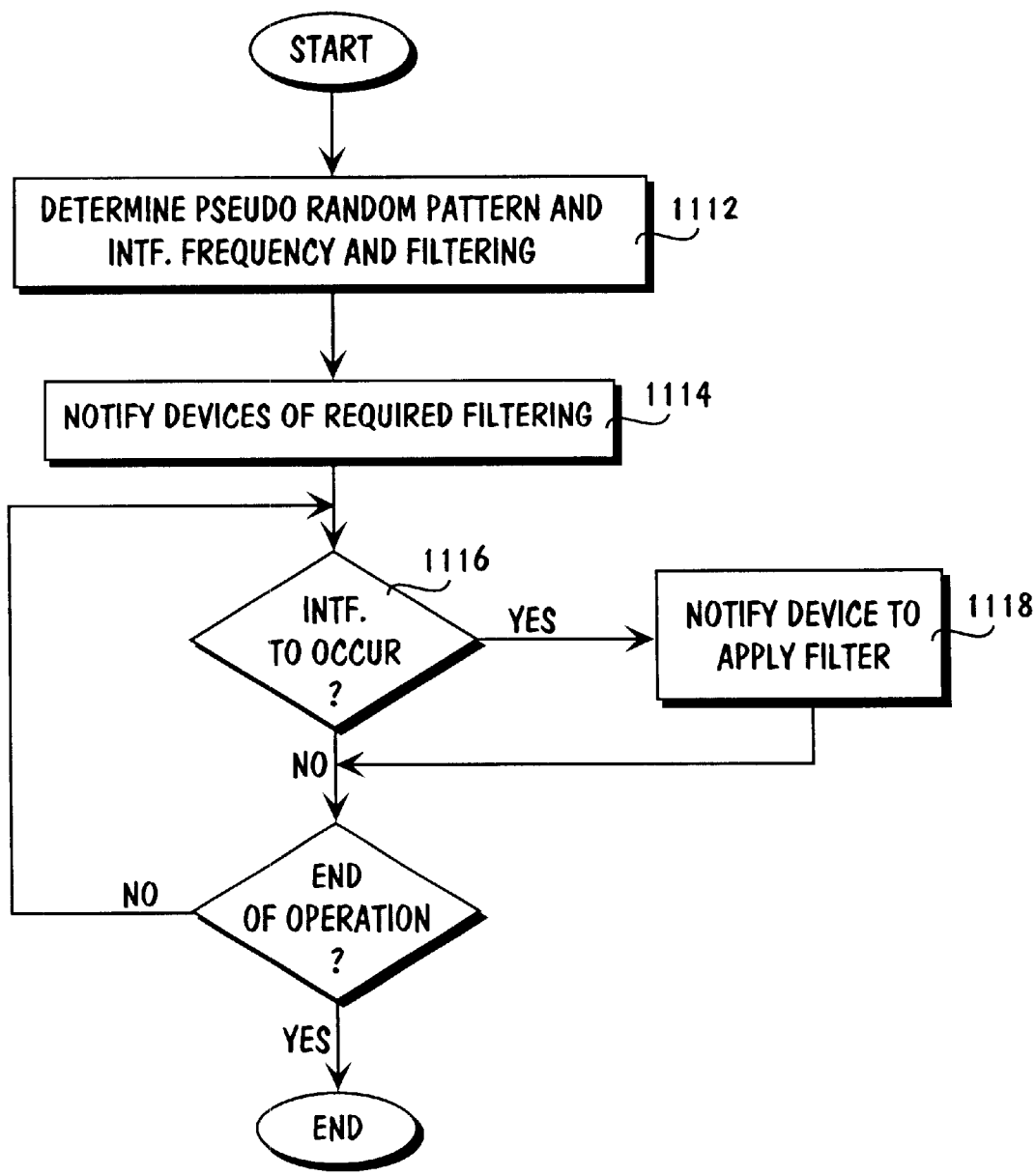
Figure 12:
FIG. 12 illustrates the concept of notch filtering.
Figure 12:
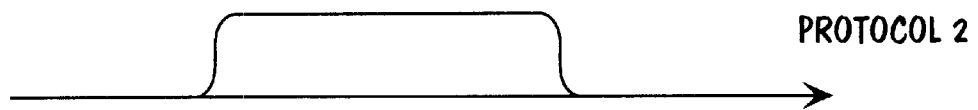
Figure 12:
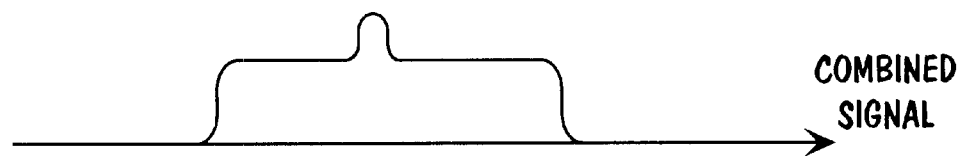
Figure 12:
Figure 12:
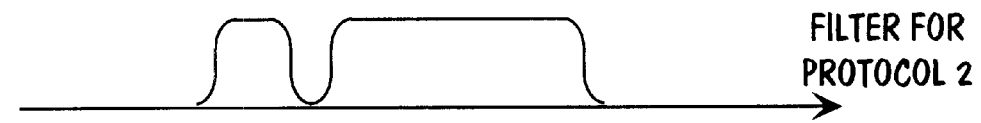

Referring now to FIGS. 11a–11b, wherein the architecture and operational flow of wireless device 100 having these added responsibilities are shown. As illustrated in FIG. 11a, wireless device 100 is basically the embodiment earlier described referencing FIG. 9a. That is, wireless device 100 is also additionally provided with network manager 1104, except the additional responsibilities assumed by network manager 1104 to proactively reduce interference are slightly different As illustrated in FIG. 11b, upon initialization, network manager 1104 monitors the operation of devices 104a and 104b for an observation period, and determines the pseudo random frequency hopping pattern followed by devices 104a, and the interfering frequency with devices 104b, 1112. This again may be accomplished using any one of a number of techniques known in the art. Next, network manager 1104 determines the corresponding filtering to be employed by devices 104a and 104b to correspondingly cancel their respective interfering signals of "the other devices", and provides the determined information to devices 104a and 104b, 1114. In one embodiment, as alluded to earlier, the corresponding filtering to be employed are notched filters inversely constructed in accordance with the other devices' signals (see FIG. 12). That is, devices 104a are to apply a notch filter, inversely formed in accordance with transmit signals of devices 104b, whereas, devices 104b are to apply a notch filter, inversely formed in accordance with transmit signals of devices 104a. [Notch filters in general are known in the art, and will not be further described.]

Then, on an on going basis, network manager 1104, predicts when interference will occur, using the determined pseudo random pattern and interference frequency, 1116. Whenever, an interference is to occur, network manager 1104 preemptively notifies devices 104a and 104b to correspondingly apply their corresponding filtering, thereby allowing both devices 104a and 104b to operate without interference, 1118. The process continues, as long as there are wireless devices of both types 104a and 104b operating. [Likewise, the application of filtering by devices 104a may also be conditionally performed, only if the frequency is indeed the same as the interfering frequency.]

As before, in one embodiment, network manager 1104 repeats the calibration periodically. In yet another embodiment, network manager 1104 monitors actual interference between devices 104a and 104b, and tracks the mean time between interference. Network manager 1104 repeats the calibration, whenever the tracked mean time between interference drops below certain given performance level.

As those skill in the art will appreciate, the immediately described improved manner of operation may also be practiced with minimal change to devices 104a and 104a, by equipping both types of network devices with the ability to responsively apply notch filtering. [Likewise, devices 104a may be additionally provided with simple combinatorial logic to effectuate the conditional application of notch filtering.]

Figure 13:
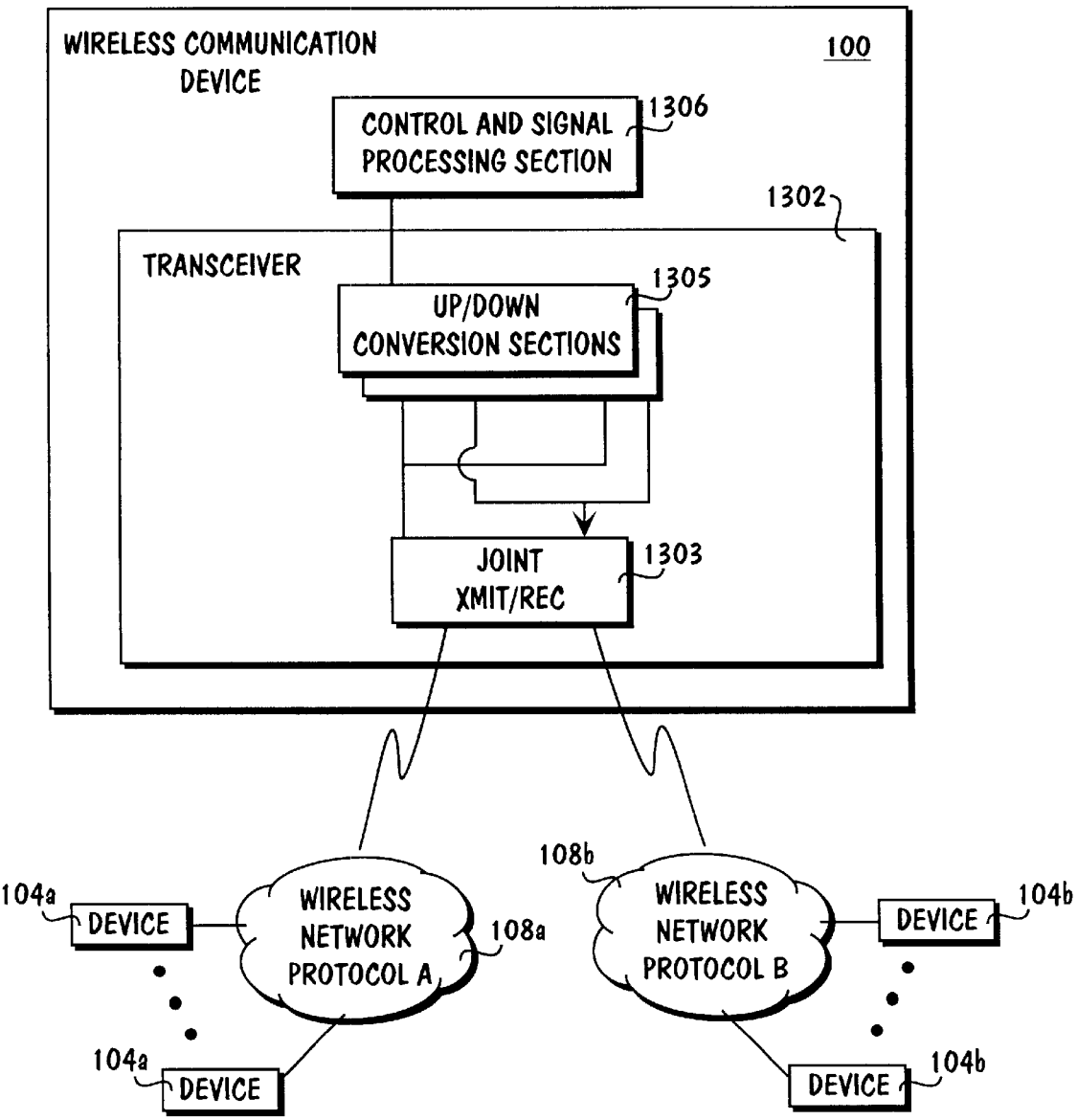
FIG. 13 illustrates an overview of the wireless device of the present invention, in accordance with another embodiment.

Referring now to FIG. 13, wherein an overview of the present invention, in accordance with another embodiment, is shown. Similar to the embodiment of FIG. 1, wireless device 100 is communicatively coupled to devices 104a and devices 104b of wireless networks 108a and 108b respectively. Wireless device 100 performs transmits and receives of the two protocols, in a coordinated manner, to allow wireless device 100 to operate with devices 104a and devices 104b of wireless network 108a and 108b in accordance with the respective protocols at the same time. However, unlike the embodiment of FIG. 1, wireless device 100 is provided with a single wireless transceiver 1302, which includes joint signal transmit/receive section 1303, and a number of transmit and receive signals up/down conversion sections 1205 sharing joint signal transmit/receive section 1303. Wireless device 100 further includes controller/signal processing (C/SP) section 1306 to process data for transmission by wireless transceiver 1302, to process signals received by wireless transceiver 1302, and to control the data/signal processing operations as well as the operation of wireless transceiver 1302. The constitution and operations of wireless device 100 is the subject of the second parent application, number <to be assigned>, which is hereby fully incorporated by reference. Additionally, in some embodiments, wireless device 100 is endowed with a network manager equipped with the capabilities earlier described referencing FIGS. 8a–8b and 9a–9b. In other embodiments, wireless device 100 is endowed with a network manager equipped with the capabilities earlier described referencing FIGS. 10 and 11a–11b. In one words, the capabilities and methods of operations described referencing FIGS. 8a–8b and 9a–9b, and FIGS. 10 and 11a–11b may be practiced with the multiple protocol wireless apparatus of the first parent application, Ser. No. 09/408,725, or the multiple protocol wireless apparatus of the second parent application.

Thus, a wireless device equipped to substantially operate currently with multiple wireless communication protocols, and various associated methods of operations have been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An apparatus comprising:
    at least one wireless transceiver and at least one controller manager, coupled to each other, to transmit and receive signals, in a coordinated manner, in accordance with a first and a second protocol, to and from first and second network devices of a first and a second wireless network communicatively coupled to the apparatus; and
    a network manager coupled to the at least one wireless transceiver and at least one controller manager to coordinate transmit and receive operations of said first and second network devices of said first and second wireless networks, to pro-actively reduce interference between said first and second network devices of said first and second wireless networks.

2. The apparatus of claim 1, wherein the first protocol is a frequency hopping protocol comprising a plurality of frequencies employed in accordance with a pseudo random pattern, and the network manager includes logic to determine a pseudo random frequency hopping pattern for said first network devices of said first wireless network.

3. The apparatus of claim 2, wherein the network manager further includes logic to predict when interference will occur between said first and second network devices of said first and second wireless networks, based on said determined pseudo random frequency hopping pattern.

4. The apparatus of claim 1, wherein the network manager further includes logic to select either said first or said second network devices as dominated devices, to be operationally dominated by the non-selected first/second network devices.

5. The apparatus of claim 4, wherein the network manager further includes logic to preemptively notify the dominated devices, whenever an interference is predicted to occur, to temporarily suspend operation to avoid interference with the dominant devices.

6. The apparatus of claim 1, wherein the network manager further includes logic to determine corresponding filtering to be employed by said first and second network devices to correspondingly cancel respective interference signals whenever an interference is predicted to occur.

7. The apparatus of claim 6, wherein the network manager further includes logic to determine first and second notch filters, inversely formed in accordance with transmit signals of said second and first network devices, for said first and second network devices.

8. The apparatus of claim 1, wherein the first and the second protocol are two protocols selected from a group consisting of Bluetooth, 802.11 frequency hopping, 802.11 direct sequence, 802.11a, 802.11b, and Home RF.

9. The apparatus of claim 1, wherein the apparatus is a computer having a form factor selected from a group consisting of a desktop type, a notebook type and a palm sized type.

10. In an apparatus having at least one wireless transceiver and at least one controller manager; a method of operation comprising:
    (a) selecting either first network devices of a first wireless network operating in accordance with a first wireless protocol or second network devices of a second wireless network operating in accordance with a second wireless protocol, to be dominant devices that operationally dominate the non-selected network devices of the other wireless network; and
    (b) operating the at least one wireless transceiver and the at least one controller manager to cause the dominated devices to pro-actively avoid interference with the dominant devices to reduce interference between said first and second network devices of the first and second wireless networks.

11. The method of claim 10, wherein the first protocol is a frequency hopping protocol comprising a plurality of frequencies employed in accordance with a pseudo random pattern, and the method further includes determining a pseudo random frequency hopping pattern for said first network devices of said first wireless network.

12. The method of claim 11, wherein the method further includes predicting when interference will occur between said first and second network devices of said first and second wireless networks, based on said determined pseudo random frequency hopping pattern.

13. The method of claim 10, wherein the method further includes preemptively notifying the dominated devices, whenever an interference is predicted to occur, to temporarily suspend operation to avoid interference with the dominant devices.

14. In an apparatus having at least one wireless transceiver and at least one controller manager; a method of operation comprising:
    (a) determining corresponding filtering to be employed by first and second network devices of a first and a second wireless networks operating in accordance with a first and a second wireless protocols respectively, to correspondingly cancel respective interference signals; and
    (b) operating the at least one wireless transceiver and the at least one controller manager to cause said first and second network devices to apply said determined filtering whenever an interference is predicted to occur between said first and second network devices of said first and second wireless networks.

15. The method of claim 14, wherein said determining includes determining first and second notch filters, inversely formed in accordance with transmit signals of said second and first network devices, for said first and second network devices.

16. A collection of networked apparatuses comprising:
    a first plurality of apparatuses wirelessly networked together, with each apparatus being equipped to communicate wirelessly in accordance with a first protocol;
    a second plurality of apparatuses wirelessly networked together, with each apparatus being equipped to communicate wirelessly in accordance with a second protocol; and
    a master apparatus equipped to communicate wirelessly with said first and second plurality of apparatuses in accordance with said first and second protocols respectively, as well as equipped to automatically coordinate transmit and receive operations conducted in accordance with said two protocols to enable a master device to manage and control said first and second plurality of apparatuses at the same time, including managing said first and second plurality of apparatuses to reduce interference with each other.

17. The collection of networked apparatuses of claim 16, wherein the first protocol is a frequency hopping protocol comprising a plurality of frequencies employed in accordance with a pseudo random pattern, and the master apparatus includes a network manager equipped to determine a pseudo random frequency hopping pattern for said first network devices of a first wireless network.

18. The collection of networked apparatuses of claim 17, wherein the network manager of the master apparatus is further equipped to predict when interference will occur between said first and second network devices of first and second wireless networks, based on said determined pseudo random frequency hopping pattern.

19. The collection of networked apparatuses of claim 16, wherein the network manager of the master apparatus is further equipped to select either first or said second network devices as dominated devices, to be operationally dominated by the non-selected first/second network devices.

20. The collection of networked apparatuses of claim 19, wherein the network manager of the master apparatus is further equipped to preemptively notify the dominated devices, whenever an interference is predicted to occur, to temporarily suspend operation to avoid interference with the dominant devices.

21. The collection of networked apparatuses of claim 16, wherein the network manager of the master apparatus is further equipped to determine corresponding filtering to be employed by first and second network devices to correspondingly cancel respective interference signals whenever an interference is predicted to occur.

22. The collection of networked apparatuses of claim 21, wherein the network manager of the master apparatus is further equipped to determine first and second notch filters, inversely formed in accordance with transmit signals of said second and first network devices, for said first and second network devices.

* * * * *